(12) United States Patent
Jerger et al.

(10) Patent No.: US 10,960,885 B2
(45) Date of Patent: Mar. 30, 2021

(54) CONTROL SYSTEM AND METHOD OF CONTROLLING A DRIVELINE

(71) Applicant: JAGUAR LAND ROVER LIMITED, Warwickshire (GB)

(72) Inventors: Rob Jerger, Coventry (GB); Russell Osborn, Coventry (GB); Christopher Harries, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 109 days.

(21) Appl. No.: 16/060,648

(22) PCT Filed: Dec. 8, 2016

(86) PCT No.: PCT/EP2016/080284
§ 371 (c)(1),
(2) Date: Jun. 8, 2018

(87) PCT Pub. No.: WO2017/097914
PCT Pub. Date: Jun. 15, 2017

(65) Prior Publication Data
US 2019/0001985 A1 Jan. 3, 2019

(30) Foreign Application Priority Data
Dec. 11, 2015 (GB) .................................... 1521876

(51) Int. Cl.
*B60K 23/08* (2006.01)
*B60W 30/18* (2012.01)
(Continued)

(52) U.S. Cl.
CPC ....... *B60W 30/18127* (2013.01); *B60K 23/08* (2013.01); *B60W 10/08* (2013.01);
(Continued)

(58) Field of Classification Search
CPC .......... B60W 30/18127; B60W 10/08; B60W 10/119; B60W 10/184; B60W 10/196; B60K 23/08
See application file for complete search history.

(56) References Cited

U.S. PATENT DOCUMENTS

| 5,529,138 A | 6/1996 | Shaw et al. |
| 7,902,693 B2 * | 3/2011 | Hijikata ................ B60W 40/02 307/10.1 |

(Continued)

FOREIGN PATENT DOCUMENTS

| CN | 1644421 A | 7/2005 |
| CN | 101450665 A | 6/2009 |

(Continued)

OTHER PUBLICATIONS

International Search Report and Written Opinion of the International Searching Authority for International application No. PCT/EP2016/080284 dated Feb. 9, 2017.

(Continued)

*Primary Examiner* — Tisha D Lewis
(74) *Attorney, Agent, or Firm* — Carlson, Gaskey & Olds

(57) ABSTRACT

Some embodiments of the present invention provide a control system configured to control a driveline of a motor vehicle to operate in a selected one of a plurality of configurations, the control system being configured to receive an environment indication signal indicative of an environment surrounding the vehicle, the control system being configured to determine, based on the environment indication signal, whether there is a need to pre-emptively brake the vehicle before brake torque is demanded of a braking system of the vehicle and the control system being configured, when it is determined that there is a need to pre-emptively brake the vehicle, to cause the driveline to operate in a second configuration and not a first configuration, (Continued)

wherein in the first configuration a first group of one or more wheels are arranged to be driven by the driveline and in the second configuration the first group of one or more wheels and in addition a second group of one or more wheels are arranged to be driven by the driveline.

19 Claims, 8 Drawing Sheets

(51) Int. Cl.
*B60W 10/184* (2012.01)
*B60W 10/196* (2012.01)
*B60W 10/119* (2012.01)
*B60W 30/14* (2006.01)
*B60W 50/08* (2020.01)
*B60W 10/08* (2006.01)
*B60W 20/00* (2016.01)
*B60K 6/48* (2007.10)

(52) U.S. Cl.
CPC ........ *B60W 10/119* (2013.01); *B60W 10/184* (2013.01); *B60W 10/196* (2013.01); *B60W 20/00* (2013.01); *B60W 30/146* (2013.01); *B60W 30/181* (2013.01); *B60W 50/082* (2013.01); *B60K 6/48* (2013.01); *B60T 2201/12* (2013.01); *B60T 2210/32* (2013.01); *B60T 2210/36* (2013.01); *B60T 2270/604* (2013.01); *B60W 2420/42* (2013.01); *B60W 2420/52* (2013.01); *B60W 2510/244* (2013.01); *B60W 2520/10* (2013.01); *B60W 2520/105* (2013.01); *B60W 2552/15* (2020.02); *B60W 2552/20* (2020.02); *B60W 2552/40* (2020.02); *B60W 2554/00* (2020.02); *B60W 2554/801* (2020.02); *B60W 2554/804* (2020.02); *B60W 2555/60* (2020.02); *B60W 2556/50* (2020.02); *B60W 2720/403* (2013.01); *B60Y 2200/92* (2013.01)

(56) References Cited

U.S. PATENT DOCUMENTS

| | | |
|---|---|---|
| 2003/0200016 A1 | 10/2003 | Spillane et al. |
| 2007/0193808 A1* | 8/2007 | Perakes ................. B60K 6/445 180/242 |
| 2012/0245817 A1 | 9/2012 | Cooprider et al. |
| 2015/0073670 A1 | 3/2015 | Matsuno |
| 2017/0015323 A1* | 1/2017 | Oguri .............. B60W 30/18127 |

FOREIGN PATENT DOCUMENTS

| | | |
|---|---|---|
| DE | 102005057285 A1 | 3/2007 |
| DE | 102011004425 A1 | 8/2012 |
| EP | 2796313 A1 | 10/2014 |
| GB | 2308415 A | 6/1997 |
| GB | 2325716 A | 12/1998 |
| GB | 2341430 A | 3/2000 |
| GB | 2381597 A | 5/2003 |
| GB | 2382158 A | 5/2003 |
| GB | 2492655 A | 1/2013 |
| GB | 2492748 A | 1/2013 |
| GB | 2499252 A | 8/2013 |
| GB | 2538738 A | 11/2016 |
| KR | 20150009670 A | 1/2015 |
| WO | 2007/074367 A2 | 7/2007 |
| WO | 2015/032827 A2 | 3/2015 |

OTHER PUBLICATIONS

Combined Search and Examination Report under Sections 17 and 18(3) for Application No. GB 1620888.6 dated May 30, 2017.
Combined Search and Examination Report under Sections 17 and 18(3) for Application No. GB1521876.1 dated Jun. 13, 2016.
First Office Action and Search Report for Chinese Application No. 201680072275.3 dated Jun. 30, 2020.

* cited by examiner

CONTROL SYSTEM AND METHOD OF CONTROLLING A DRIVELINE

INCORPORATION BY REFERENCE

The entire contents of co-pending UK patent application GB1202427.9 (publication number GB2499252), UK patents GB2325716, GB2308415, GB2341430, GB2382158, GB2492748, GB2492655 and GB2381597 and US2003/0200016 are expressly incorporated herein by reference.

TECHNICAL FIELD

The present disclosure relates to a vehicle controller and control method and particularly, but not exclusively, to a controller and a method for controlling a vehicle driveline or a driveline component such as a transmission. Aspects of the invention relate to a controller, to a transmission, to a driveline, to a powertrain, to a vehicle and to a method.

BACKGROUND

It is known to provide a motor vehicle having a four wheel drive mode of operation in which motive power is supplied to each of two pairs of wheels of the vehicle. Each pair of wheels may be considered to form part of an axle assembly, the vehicle having a front axle assembly and a rear axle assembly. Motive power is supplied to the wheels by means of a driveline.

Some known vehicles are arranged such that motive power is permanently supplied to both axle assemblies. Some other vehicles are arranged such that motive power is selectively supplied to either only one axle assembly or to both axle assemblies. A driver operable selector may be provided to allow the driver to select two wheel (front or rear axle assembly) and four wheel (dual axle assembly) operation.

Some driveline systems require the vehicle to be stationary when transitioning between two and four wheel drive modes. Such systems may be referred to as static disconnect/reconnect systems.

GB2407804 discloses a dynamic driveline reconnect arrangement in which reconnection of the wheels of one axle assembly to the driveline following disconnection of the wheels of that axle assembly may be undertaken when the vehicle is moving. Such a system may be referred to as a dynamic driveline reconnect system. The system disclosed in GB2407804 employs clutch arrangements to enable dynamic driveline reconnection.

In some known dynamic driveline reconnect systems the vehicle is operable automatically to disconnect the driveline from two of the wheels when a prescribed condition is met so that the vehicle operates in a two wheel drive mode. The system automatically reconnects the driveline to enable four wheel drive operation when the prescribed condition is not met.

It is an aim of embodiments of the present invention to at least partially mitigate the disadvantages of known dynamic driveline systems.

STATEMENT OF THE INVENTION

Embodiments of the invention may be understood by reference to the appended claims.

Aspects of the invention provide a control system, a driveline, a powertrain, a motor vehicle, a method, a carrier medium, a computer program product, a computer readable medium and a processor.

In an aspect of the invention for which protection is sought there is provided a control system configured to control a driveline of a motor vehicle to operate in a selected one of a plurality of configurations, the control system being configured to receive an environment indication signal indicative of an environment surrounding the vehicle, the control system being configured to determine, based on the environment indication signal, whether there is a need to pre-emptively brake the vehicle before brake torque is demanded of a braking system of the vehicle and the control system being configured, when it is determined that there is a need to pre-emptively brake the vehicle, to cause the driveline to operate in a second configuration and not a first configuration, wherein in the first configuration a first group of one or more wheels are arranged to be driven by the driveline and in the second configuration the first group of one or more wheels and in addition a second group of one or more wheels are arranged to be driven by the driveline.

This feature has the advantage that the driveline may cause the second group of one or more wheels to provide brake force in certain situations, for example where the environment indication signal indicates that there is a need to pre-emptively brake the vehicle. The control system may, for example, cause the driveline to provide driveline braking such as engine braking or braking by means of an electric machine coupled to the driveline.

Optionally, the control system is configured to employ regenerative braking whereby wheels connected to the driveline cause one or more electric machines coupled to the driveline to generate electrical current for storage in a charge storage device.

The charge storage device may be a battery or capacitive storage device.

The vehicle may have a driveline arranged to drive two groups each of two wheels, the first configuration corresponding to a two wheel drive mode of operation and the second configuration corresponding to a four wheel drive mode of operation.

Optionally, the environment indication signal is indicative of presence of traffic lights ahead of the vehicle.

Optionally, the environment indication signal is indicative of a state of the traffic lights.

Optionally, the environment indication signal is indicative of traffic ahead of the vehicle.

Optionally, the environment indication signal is indicative of at least one of: density of traffic; speed of traffic.

Optionally, the environment indication signal is indicative of a speed limit.

Optionally, the environment indication signal is received from a camera.

Optionally, the environment indication signal is received from a radar module which indicates objects relative to the vehicle.

Optionally, the radar module indicates at least one of: position of objects relative to the vehicle; speed of objects relative to the vehicle.

Optionally, the environment indication signal is received from a data link to the vehicle.

Optionally, the control system is configured to use a combination of map data and the environment indication signal to determine whether there is a need to brake the vehicle.

Optionally, the control system is configured to determine whether there is a need to pre-emptively brake the vehicle based on at least one of:
- an amount of longitudinal acceleration experienced by the vehicle;
- an inclination of a driving surface;
- gradient;
- a parameter indicative of a coefficient of surface friction between one or more wheels and a driving surface;
- a selected driving mode in which the vehicle is operating, the driving mode being selected from a plurality of driving modes.

Optionally, the control system is further configured to determine the amount of regenerative braking.

Optionally, the control system is configured to calculate the amount of regenerative braking required dependent upon one or more of the following parameters:
- (a) a signal indicative of the probability that the vehicle is required to slow to a halt or relatively low speed at a given moment in time;
- (b) longitudinal acceleration of the vehicle;
- (c) driving surface inclination;
- (d) surface coefficient of friction between wheels of the vehicle and the driving surface;
- (e) the driving mode in which the vehicle is operating;
- (f) the powertrain mode in which the vehicle is operating;
- (g) the state of charge (SOC) of the vehicle battery 1B; and
- (h) vehicle speed.

The control system may comprise one or more electronic controllers.

It is to be understood that the controller or controllers described herein may comprise a control unit or computational device having one or more electronic processors. The system may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device. The controller may be implemented in software run on one or more processors. One or more other controllers may be implemented in software run on one or more processors, optionally the same one or more processors as the controller. Other arrangements may be useful in some embodiments.

In an aspect of the invention for which protection is sought there is provided a method of controlling a driveline of a motor vehicle to operate in a selected one of a plurality of configurations, the method comprising:
- receiving an environment indication signal indicative of an environment surrounding the vehicle;
- determining, based on the environment indication signal, whether there is a need to pre-emptively brake the vehicle before brake torque is demanded of a braking system of the vehicle; and
- when it is determined that there is a need to pre-emptively brake the vehicle, to cause the driveline to operate in a second configuration and not a first configuration, wherein in the first configuration a first group of one or more wheels are arranged to be driven by the driveline and in the second configuration the first group of one or more wheels and in addition a second group of one or more wheels are arranged to be driven by the driveline.

In one aspect of the invention for which protection is sought there is provided a driveline in combination with a system according to a preceding aspect.

In one aspect of the invention for which protection is sought there is provided a powertrain comprising a driveline and a system according to a preceding aspect.

In another aspect of the invention for which protection is sought there is provided a motor vehicle comprising a driveline and a system according to a preceding aspect.

In an aspect of the invention for which protection is sought there is provided a motor vehicle comprising a body, a plurality of wheels, a powertrain to drive said wheels, the powertrain comprising a driveline and a braking system to brake said wheels, and a system according to a preceding aspect.

In one aspect of the invention for which protection is sought there is provided a carrier medium carrying computer readable code for controlling a vehicle to carry out the method of another aspect.

In a further aspect of the invention for which protection is sought there is provided a computer program product executable on a processor so as to implement the method of another aspect.

In one aspect of the invention for which protection is sought there is provided a computer readable medium loaded with the computer program product of another aspect.

In another aspect of the invention for which protection is sought there is provided a processor arranged to implement the method of another aspect, or the computer program product of another aspect.

In a further aspect of the invention for which protection is sought there is provided a carrier medium carrying computer readable code for controlling a vehicle to carry out the method of another aspect.

In a still further aspect of the invention for which protection is sought there is provided a computer program product executable on a processor so as to implement the method of another aspect.

In another aspect of the invention for which protection is sought there is provided a computer readable medium loaded with the computer program product of another aspect.

In one aspect of the invention for which protection is sought there is provided a processor arranged to implement the method of another aspect.

The pre-emptive braking by causing the driveline to operate in the second configuration may have an advantage that a friction foundation braking system may not need to be employed, or may be employed to generate a reduced amount of braking, thus reducing wear and tear. In addition, in vehicles having a driveline configured for regenerative braking capability, use may be made of the regenerative braking capability to effect vehicle braking and generate energy such as electrical energy in the case of an electrical regenerative braking system.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described with reference to the accompanying figures in which.

DETAILED DESCRIPTION

Figure 1:
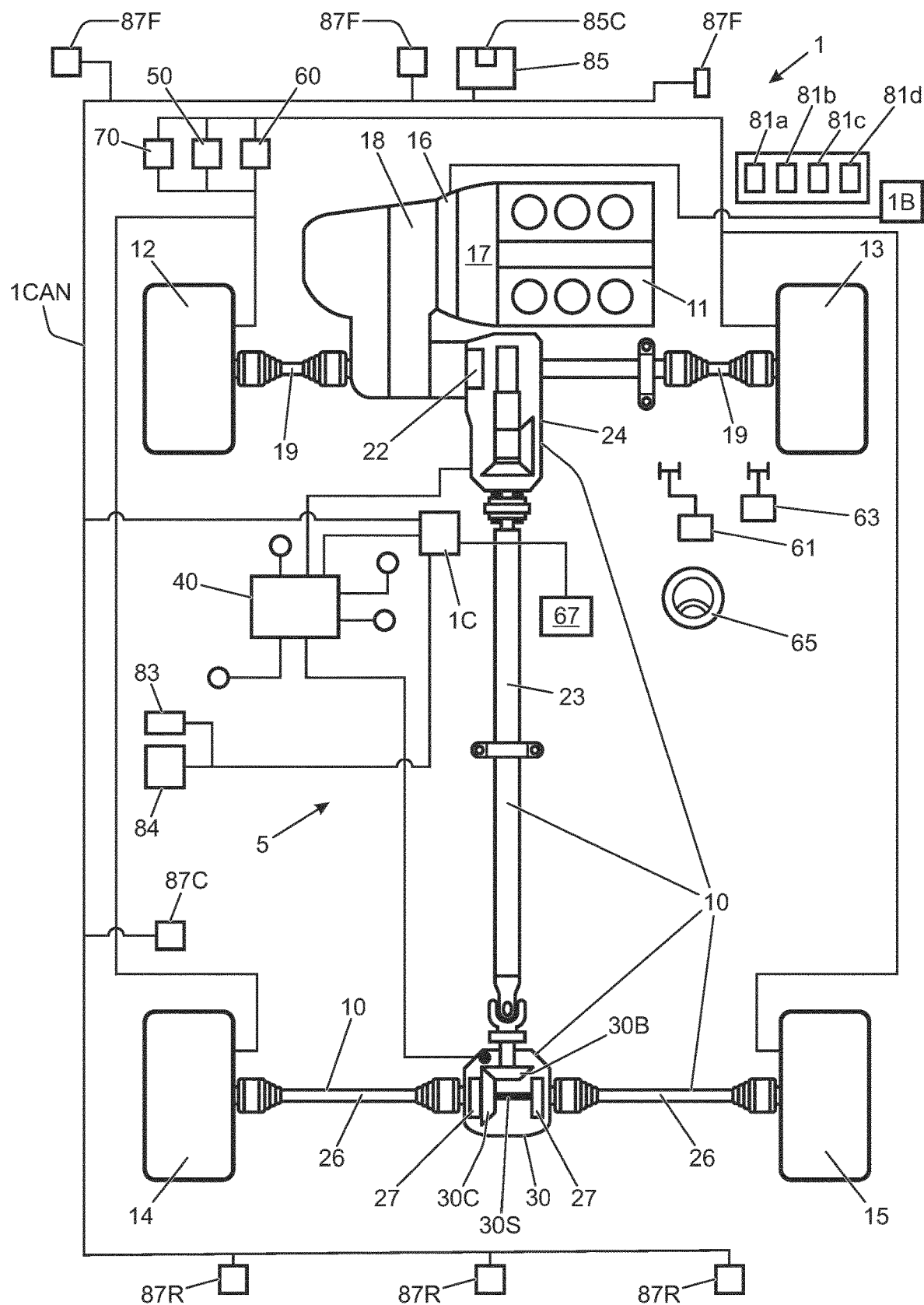
FIG. 1 is a schematic illustration of a vehicle according to an embodiment of the present invention.

A driveline 5 of a motor vehicle 1 according to an embodiment of the present invention is illustrated schematically in FIG. 1. The driveline 5 is connected to two prime mover devices by means of a gear box 18. The two prime mover devices are a crankshaft-integrated motor generator (CIMG) 16 and an internal combustion engine 11. The internal combustion engine 11 is coupled to the CIMG 16 by means of a clutch device 17. The CIMG 16 is in turn coupled to an input shaft of the gearbox 18 substantially permanently although in some embodiments the CIMG 16 may be coupled to the gearbox 18 by means of a clutch device. An output shaft of the gearbox 18 is coupled to the driveline 5.

The driveline 5 has a pair of front wheels 12, 13, an auxiliary portion 10 and a pair of rear wheels 14, 15.

The driveline 5 is arranged selectively to transmit power supplied to it by the gearbox 18 from the internal combustion engine 11 and/or CIMG 16 to the front wheels 12, 13 only (in a two wheel drive mode of operation) or to the front wheels 12, 13 and the rear wheels 14, 15 simultaneously (in a four wheel drive mode of operation).

Power is transmitted from the internal combustion engine 11 and/or CIMG 16 to the front wheels 12, 13 by means of a clutch 17, a gearbox 18 and a pair of front drive shafts 19.

Power is transmitted to the rear wheels 14, 15 by means of the auxiliary portion 10 of the driveline 5. The auxiliary portion 10 has a power transfer unit (PTU) 24 having a power transfer clutch (PTC) 22 operable to connect a main drive shaft or prop shaft 23 of the auxiliary portion 10 to the gearbox 18. The prop shaft 23 is coupled in turn to a rear drive unit (RDU) 30 operable to couple the prop shaft 23 to rear drive shafts 26.

The RDU 30 has a pair of clutches 27 having input portions driven by a spool shaft 30S. The spool shaft 30S is driven by a crown gear 30C which is in turn driven by a bevel gear 30B driven by the prop shaft 23. The clutches 27 enable the RDU 30 to connect the prop shaft 23 to the rear drive shafts 26 when the four wheel drive mode of operation is required.

The driveline 5 has a controller 40 arranged to control operation of the PTU 24 and clutches 27. When a four wheel drive mode of operation is required the controller 40 is arranged to close the PTC 22 and to close clutches 27 of the RDU 30. Since the driveline 5 forms part of a powertrain, which includes the engine 11 and gearbox 18, the controller 40 may in some embodiments control the engine 11 and optionally the gearbox 18 in addition to the driveline 5 and could be referred to as a powertrain controller. The controller 40 may be arranged to attempt to cause the engine 11 to develop a required amount of torque and/or to rotate at a required speed in some embodiments.

In the embodiment of FIG. 1 the PTC 22 and RDU clutches 27 have respective actuators operable to close the PTC 22 and respective clutches 27 at a selected one of a plurality of different rates. This allows the transition from the two wheel drive mode of operation to the four wheel drive mode of operation to be made at one of a corresponding plurality of different rates. It is to be understood that, in the case of a friction clutch, as the clutch is closed, a maximum amount of torque that the clutch is able to transmit from an input to an output thereof increases to a maximum transfer torque value associated with the fully closed condition. In the case of a multi-plate wet clutch the maximum amount of torque the clutch can transmit may be responsive at least in part to an amount of pressure applied to the plates of the clutch.

For the present purposes, a driveline 5 will be considered to be in the four wheel drive mode or configuration if the (non-zero) pressure applied to the plates of one or both of the clutches 27 exceeds a predetermined value, being a value higher than the value when the driveline 5 is in the two wheel drive mode or configuration. The predetermined value may be determined to be a value that will allow torque of up to a predetermined (non-zero) torque value to be transmitted by a clutch 27.

It is to be understood that the rate at which the respective actuators actuate the respective clutch arrangements may affect a rate of wear of the clutches and potentially one or more other components of the driveline 5. The rate of actuation may also impact the level of NVH (noise, vibration and harshness) experienced by a driver or passenger of a vehicle.

Recognising this, the present inventors have realised that in some circumstances it is desirable to actuate the clutches 27 of the RDU 30 and/or the PTC 22 at a reduced rate in order to reduce a rate at which the rear wheels 14, 15 and/or gearbox are connected to the prop shaft 23. This can reduce a rate of wear of components of the driveline 5 and reduce NVH associated with a transition from the first mode to the second mode.

The controller 40 of the driveline 5 is arranged to control the auxiliary driveline 10 such that slower rates of actuation of the PTC 22 and clutches 27 are employed when a requirement to assume the four wheel drive mode of operation of the driveline 5 is less urgent and higher rates of actuation are employed when the requirement to assume the four wheel drive mode is more urgent.

The vehicle 1 is provided with an antilock braking system (ABS) module 50 arranged to control a brake of one or more wheels of the vehicle to reduce an amount of braking action when required in order to prevent skidding. The vehicle 1 also has a dynamic stability control system (DSC) 60 arranged to control an amount of torque delivered to one or more wheels of the vehicle to prevent wheel slip.

Furthermore, the vehicle 1 has a traction control system (TCS) 70 arranged to monitor wheels of the vehicle 1 and to apply a brake to a wheel in the event that it is determined that the wheel is rotating at a speed that is higher than that required for substantially no wheel slip to occur.

Figure 2:
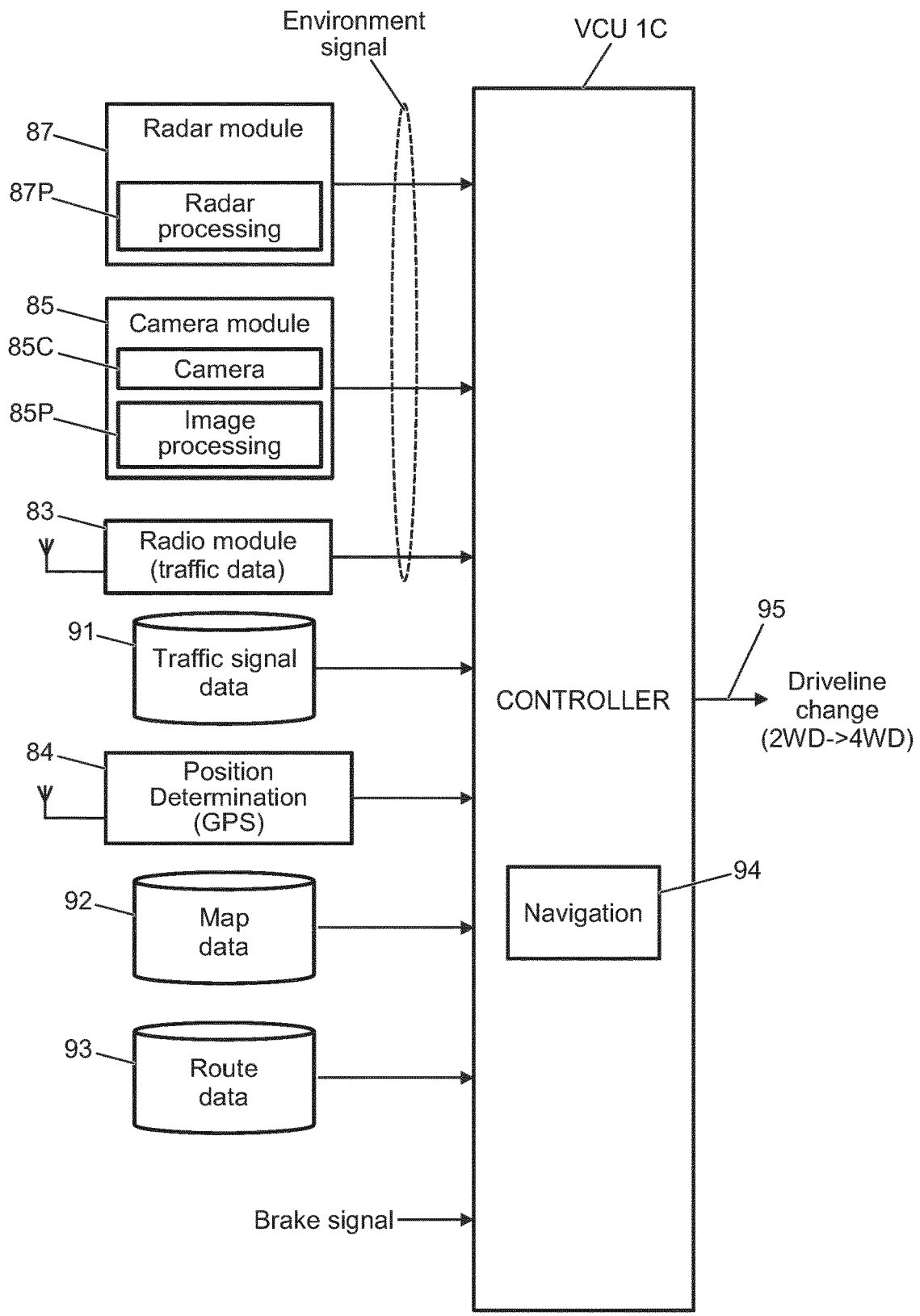
FIG. 2 is a schematic illustration of a control system according to an embodiment of the present invention.

The vehicle has a vehicle control unit (VCU) 10 that is configured to perform a number of vehicle control functions. The VCU 1C receives input signals from a number of vehicle sensors. The sensors (not shown) include sensors which provide continuous sensor outputs to the VCU 1C, including wheel speed sensors, an ambient temperature sensor, an atmospheric pressure sensor, tyre pressure sensors, yaw sensors to detect yaw, roll and pitch of the vehicle, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor (part of a stability control system (SCS)), a brake pedal position sensor, an acceleration pedal position sensor and longitudinal, lateral, vertical motion sensors. Other inputs to the VCU 1C are shown in FIG. 2.

In some other embodiments, only a selection of the aforementioned sensors may be used.

The vehicle 1 is also provided with a plurality of sensors which provide discrete sensor outputs to the VCU 1C, including a transfer box or PTU status signal (indicating whether a gear ratio of the PTU 24 is set to a HI range or a LO range), a TCS signal and a DSC signal. It is to be understood that the TCS and DSC signals each provide an indication as to whether the TCS or DSC systems 70, 60 are currently intervening to control application of brake torque and/or powertrain torque to one or more wheels, as appropriate, to improve vehicle stability.

The vehicle 1 has a camera module 85 having a forward facing video camera 85C that is configured to provide a live video feed to the VCU 1C. One or more rear facing cameras may be provided in some embodiments. The vehicle 1 also has three forward radar transmit/receive modules 87F and three rear radar transmit/receive modules 87R. The forward and rear modules 87F, 87R are configured to transmit radar waves and to detect transmitted waves that are reflected by objects ahead of and behind the vehicle 1, respectively. Signals generated by the modules 87F, 87R are fed to a radar control module 87C via vehicle controller area network (CAN) bus 1CAN. The radar control module 87C is configured to process the signals received and provide an output to the VCU 1C indicative of the distance of detected objects from the vehicle and their relative direction from the vehicle 1. It is to be understood that other numbers of forward and/or rear facing radar modules 87F, 87R may be employed in some embodiments. In some embodiments only one or more front facing modules 87F may be provided, or one or more rear facing modules 87R.

The vehicle 1 also has a radio module 83 configured to receive a live traffic data signal from a traffic data service, and a live weather data signal from a weather data service. The module 83 processes the data and outputs the data to the VCU 1C. A location determining system in the form of a global positioning system (GPS) module 84 is also provided that is configured to determine the geographical location of the vehicle 1 by reference to GPS satellite signals. In some embodiments an alternative system for determining vehicle location may be employed such as a general packet radio service (GPRS) module. The VCU 1C is provided with navigation aid functionality. The VCU 1C is configured to allow a user to input an intended destination of the vehicle 1, in response to which the VCU 1C is configured to calculate an optimum route of travel to the intended destination and to provide navigation instructions to the user to enable the user to follow the optimum route.

The vehicle 1 has five subsystems that may be caused by the VCU 1C to operate in one of a plurality of different subsystem configuration modes in order to provide different vehicle performance characteristics such that the vehicle may be operated in a predetermined one of a plurality of different driving modes. Thus, the VCU 1C causes each of the plurality of vehicle subsystems 81a-d, 50 to operate in the subsystem configuration mode appropriate to the selected driving mode. In the present embodiment the subsystems 81a-d, 50 are an engine management system 81a, a transmission control system 81b, an electronic power assisted steering unit 81c (ePAS unit), ABS module 50 and a suspension control system 81d.

In the present embodiment, the VCU 1C is configured to operate the subsystems according to the driving mode that has been selected either manually by a user by means of a selector dial provided in a switchpack 67 accessible to the driver whilst driving, or automatically by the VCU 1C in response at least in part to signals received from various sensors on the vehicle 1. In the automatic mode of driving mode selection, the VCU 1C selects the driving mode according to the type of terrain in which the vehicle 1 is operating as determined by reference at least in part to the signals received from the sensors, as described in UK patent GB2492655 referred to above.

The driving modes include a grass/gravel/snow driving mode (GGS mode) that is suitable for when the vehicle is travelling in grass, gravel or snow terrain, a mud/ruts driving mode (MR mode) which is suitable for when the vehicle is travelling in mud and ruts terrain, a rock crawl/boulder mode (RB mode) which is suitable for when the vehicle is travelling in rock or boulder terrain, a sand mode which is suitable for when the vehicle is travelling in sand terrain (or deep soft snow) and a special programs OFF mode (SP OFF mode) which is a suitable compromise mode, or general mode, for all terrain conditions and especially vehicle travel on motorways and regular roadways. The SP OFF mode may also be referred to as an 'on-road' or 'on-highway' driving mode. Many other driving modes are also envisaged.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains.

The manner in which the VCU 1C is configured to cause the subsystems 81a-d, 50 to operate in different respective driving modes is described in more detail in UK patent GB2492655 referred to above.

Although five subsystems 81a-d, 50 are illustrated as being under the control of the VCU 10, in practice a greater number of vehicle subsystems 81a-d, 50 may be included on the vehicle 1 and may be under the control of the VCU 1C. The VCU 1C includes a subsystem control module which provides control signals to each of the vehicle subsystems 81a-d, 50 to cause each subsystem 81a-d, 50 to operate in the subsystem configuration mode corresponding to the selected driving mode. Thus, each subsystem 81a-d, 50 may be caused to operate in a manner appropriate to the driving condition, such as the terrain or driving surface, in which the vehicle 1 is travelling (referred to as the terrain condition).

The subsystems 81*a*-*d*, 50 also communicate with the subsystems control module of the VCU 1C to feed back information on subsystem status.

It is to be understood that in the present embodiment the controller 40 is operable to control the driveline 5 to assume the four wheel drive mode in dependence on the driving mode in which the VCU 1C is causing the vehicle 1 to operate. In the present embodiment, the controller 40 causes the driveline 5 to operate in the four wheel drive mode when the VCU 1C is operating in a driving mode other than the on-highway driving mode. When the VCU 1C is operating in the on-highway driving mode the VCU 1C causes the controller 40 to cause the driveline to operate in the two wheel drive or four wheel drive mode according to an active driveline control strategy.

In the present embodiment, when operating in the on-highway driving mode the controller 40 is arranged to cause the driveline 5 to operate in the two wheel drive mode at speeds above a predetermined upper threshold speed for four wheel drive operation, v_U4WD. In the case that the driveline 5 is in the four wheel drive mode and the speed exceeds v_U4WD, the controller 40 causes the driveline 5 to assume the two wheel drive mode. This feature has the advantage that the vehicle 1 will typically consume less fuel, and may also emit a lower amount of unwanted combustion products compared with continued operation in the four wheel drive mode above v_U4WD. In the present embodiment the value of v_U4wd is set to a value of 35 kph although other values may be useful in some embodiments such as 30 kph, 40 kph or any other suitable value.

If the driveline 5 is in the two wheel drive mode and the vehicle speed falls below a predetermined lower threshold speed for four wheel drive operation, v_L4WD, the controller 40 causes the driveline 5 to switch from the two wheel drive mode to the four wheel drive mode. In the present embodiment, v_L4WD is set to a value of 12 kph although other values may be useful in some embodiments such as 10 kph, 15 kph, 20 kph, 25 kph or any other suitable value. It is to be understood that, since v_L4WD<v_U4WD, hysteresis is present in respect of the speeds at which transitions between the two and four wheel drive modes occur. This feature has the advantage that it reduces the risk of mode chattering which might otherwise occur if v_L4WD were substantially equal to v_U4WD and the vehicle speed was to oscillate between speeds above and below v_L4WD in relatively rapid succession.

In the present embodiment, the engine management system 81*a* is configured to control the delivery of drive torque to the driveline 5 by the engine 11 and CIMG 16 according to a powertrain control strategy that is intended to reduce the amount of carbon dioxide emitted by the vehicle during a given drive cycle. The engine management system 81*a* is operable to cause the CIMG 16 to operate as a motor and provide positive drive torque to the driveline 5, or as a generator and provide negative torque to the driveline 5, and in addition to switch the engine 11 on and off, under the control of the VCU 1C. The VCU 10 determines whether to operate the CIMG 16 as a motor or generator (or neither) and whether to maintain the engine 11 in an on or off condition according to the powertrain control strategy.

The vehicle 1 has a battery module 1B that includes an inverter that is electrically connected to the CIMG 16 so as to supply power to drive the CIMG 16 as a motor when required, and to receive charge generated by the CIMG 16 when operated as a generator. Under the powertrain control strategy, the VCU 1 determines which of the following powertrain modes the vehicle should operate in at a given moment:

(a) a parallel boost hybrid mode in which the CIMG 16 and engine 11 provide positive drive torque to the driveline 5 in response to powertrain torque demand substantially simultaneously;

(b) a parallel recharge hybrid mode in which the CIMG 16 is driven as a generator whilst the engine 11 provides positive drive torque to the driveline 5 in response to powertrain torque demand whereby the battery module 1B may be recharged by the CIMG 16;

(c) an electric vehicle (EV) mode in which the engine 11 is switched off and the CIMG 16 alone provides positive drive torque to the driveline 5 in response to powertrain torque demand; and (d) a hybrid inhibit mode in which the CIMG 16 is not operated as a motor and not operated as a generator, the engine 11 remaining switched on during the course of a given drive cycle to provide positive drive torque as required.

The controller VCU 1C is configured to determine when to cause the driveline 5 to operate in a second configuration (e.g. 4WD) and not a first configuration (e.g. 2WD). The controller VCU 1C can pre-emptively brake the vehicle, before brake torque is demanded of the braking system, by changing the driveline 5 into the four wheel drive configuration. The controller VCU 1C can pre-emptively brake the vehicle, before brake torque is demanded of the braking system by a driver (e.g. by a driver pressing the brake pedal). Additionally, or alternatively, the controller VCU 1C can pre-emptively brake the vehicle, before brake torque is demanded of the braking system by an automatic control system (e.g. a cruise control system or active speed control system). The controller VCU 1C can determine, based on one or more environment inputs, whether there is a need to pre-emptively brake the vehicle. When it is determined that there is a need to pre-emptively brake the vehicle, the controller VCU 1C can cause the driveline to operate in a second configuration (i.e. 4WD configuration) instead of a first configuration (i.e. 2WD configuration). The controller VCU 1C can use the one or more environment signals to determine a probability that the vehicle is required to slow to a halt or relatively low speed at a given moment in time.

The controller VCU 1C may receive a brake signal. The brake signal can be indicative of application of a braking system of the vehicle. The brake signal can indicate an amount of braking torque being demanded of the braking system. The controller VCU 1C can determine if there is a need to pre-emptively brake the vehicle when the brake signal indicates that the braking system has not been applied, or if there is no braking torque demanded of the braking system.

FIG. 2 shows the controller VCU 1C and a set of modules 83, 85, 87 which can supply environment signals to the controller VCU 1C. One or more of the modules 83, 85, 87 may be present. The controller VCU 1C uses one or more of the environment signals to determine whether there is a need to pre-emptively brake the vehicle by changing the driveline to the 4WD configuration. The controller VCU 1C outputs a driveline change signal 95 to control the change in driveline configuration. For example, signal 95 may be applied to controller 40 shown in FIG. 1.

A radar module 87 provides a signal which is indicative of an environment which is around the vehicle. For example, a forward-facing radar module 87F provides a signal which is indicative of an environment which is ahead of the vehicle and a rearward-facing radar module 87R provides a signal which is indicative of an environment which is behind the vehicle. A radar processing module 87P processes data generated by the one or more radar modules 87 and generates data indicative of the position and speed of target objects relative to the vehicle 1 as determined by the radar modules 87. A target object may be another vehicle. The radar processing 87P may alternatively be performed by the controller VCU 1C itself.

A camera 85C within the camera module 85 generates a stream of video frame data. An image processing module 85P processes the images to identify the presence of target objects ahead of the vehicle 1. Target objects can include one or more of: other vehicles; a feature of another vehicle (e.g. a brake light or turn indicator); traffic control signals (e.g. traffic lights); traffic signs (e.g. signs indicating a speed limit or a need to reduce speed). The image processing 85P may use image recognition techniques to identify features which may indicate a need to brake the vehicle. The image processing 85P extracts environment data which is useful to the controller VCU 1C. For example, image processing may determine that there are traffic control signals ahead of the vehicle which are currently at red, or turning to red. Image processing of the stream of video frame data acquired by the camera 85C may determine whether the vehicle 1 is approaching stationary or slow moving traffic. Image processing may determine whether brake lights of any vehicles ahead of the vehicle 1 are illuminated, indicating that the traffic may be stationary, slow moving, or slowing. Each of the above are examples of environment signals where there may be a need to pre-emptively brake the vehicle 1. The image processing 85P may alternatively be performed by the controller VCU 1C itself.

The controller VCU 1C may use a combination of data generated by the radar module 87 in combination with the camera 85.

In some embodiments, the controller VCU 1C may determine an environment signal based on the current position of the vehicle, or the route of the vehicle, in combination with a local store of data and/or external data. For example, a position determining function 84 (e.g. GPS) indicates the current position of the vehicle 1. A navigation function 94 of the VCU 1C may determine a route for the vehicle using a store of map data 92 and the position determining function 84. The navigation function 94 may use route data 93 (e.g. indicating a destination or waypoints along the route.) The map data 92 may indicate the presence of road features where there may be a need to pre-emptively brake the vehicle 1. For example, the map data 92 may indicate road junctions and/or traffic control signals ahead of the vehicle.

The controller VCU 1C may correlate the map data 92 with the information in respect of traffic and traffic control signal status obtained using the camera module 85 and radar modules 87 as described above in order more reliably to determine the probability that the vehicle 1 will slow to a halt or relatively low speed. For example, it is to be understood that the map data 92 may in some embodiments be useful in enabling the VCU 1C to determine whether traffic detected ahead of the vehicle 1 by means of the camera module 85 or radar modules 87 is in a path of the vehicle based on road layout data and, optionally, a predicted route of the vehicle, for example based on navigation guidance information generated in response to vehicle destination data. Similarly, the map data may be useful in determining whether a given traffic control signal detected by the camera module 85 must be obeyed by the vehicle 1. This may be particularly useful at relatively complex junctions where traffic control signals controlling traffic travelling along different routes are detected in images generated by the camera module 85.

In some embodiments the VCU 1C may, in addition or instead, receive traffic light sequencing information from a database 91 forming part of the VCU 1 or external to the vehicle, for example via a wireless communications link such as via radio module 83. The sequencing information 91 may be employed by the VCU 1C to determine the state of a traffic signal ahead of the vehicle 1, for example whether the signal indicates a vehicle may continue beyond a control point, being a point controlled by the traffic signal, or whether the vehicle must stop at the control point. In some embodiments the VCU 1C may predict, based on the distance of the vehicle 1 from the traffic control point and optionally information in respect of any traffic ahead of the vehicle 1, whether the vehicle 1 is likely to be required to slow to a halt or relatively low speed.

It is to be understood that the VCU 1C may also take into account traffic information received by radio module 83 via a wireless traffic information data link such as an internet-based traffic information data link, traffic message channel (TMC) traffic information or any other suitable traffic information source. The traffic information may include information in respect of traffic density and speed at a given geographical location. The VCU 1C may be configured to increase the probability of a need to pre-emptively brake the vehicle for higher values of traffic density.

Figure 3:
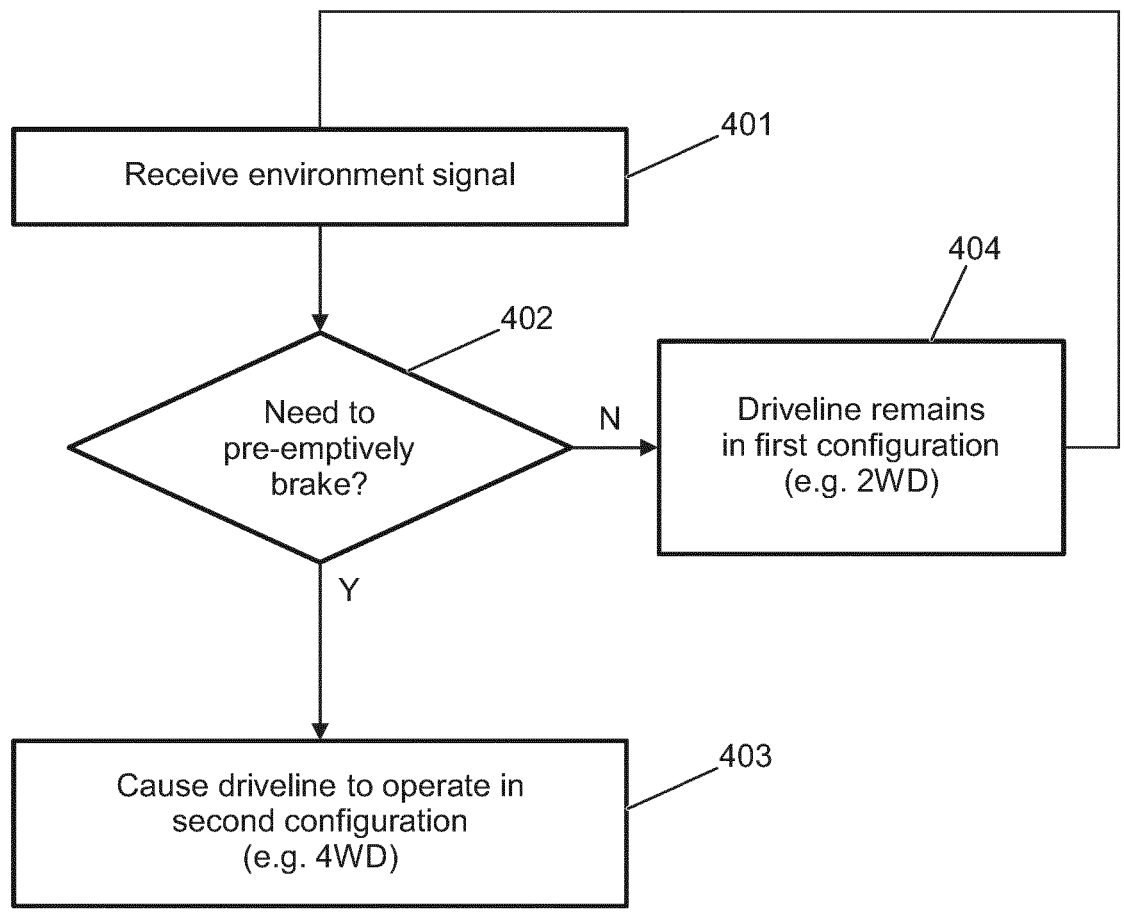
FIG. 3 shows a method of controlling a vehicle.

FIG. 3 shows a method which can be performed, for example, by the controller VCU 1C. At block 401, one or more environment signals are received. At block 402, the method determines if there is a need, based on the one or more environment indication signals, whether there is a need to pre-emptively brake the vehicle before brake torque is demanded of the braking system. If block 402 determines that there is a need to pre-emptively brake the vehicle, the method proceeds to block 403 and causes the driveline to operate in a second configuration (e.g. 4WD) and not a first configuration (e.g. 2WD). If block 402 determines that there is not a need to pre-emptively brake the vehicle, the method proceeds to block 404 and remains in the first configuration (e.g. 2WD). The method can repeat by returning to block 401.

Figure 4:
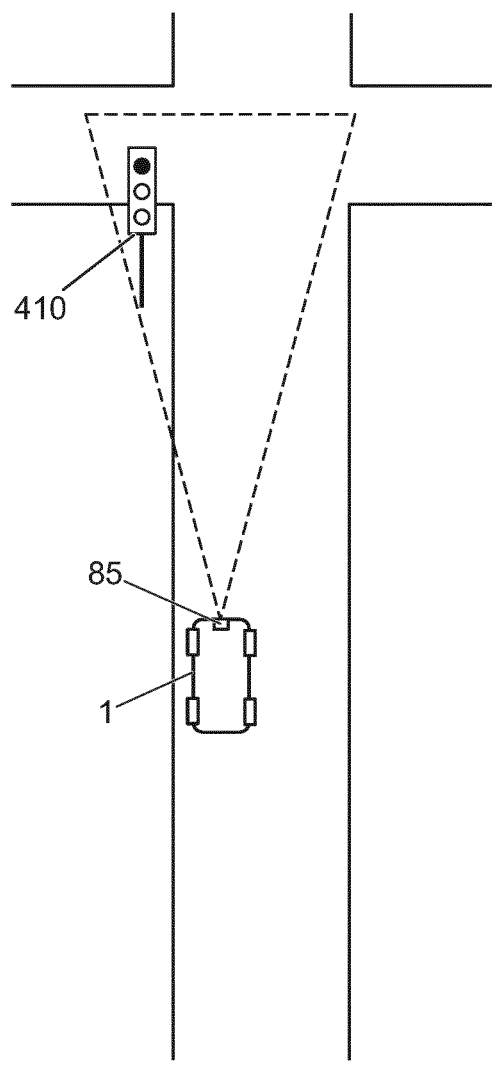
FIG. 4 is a schematic illustration of a scenario in which a vehicle may be used.
Figure 5:
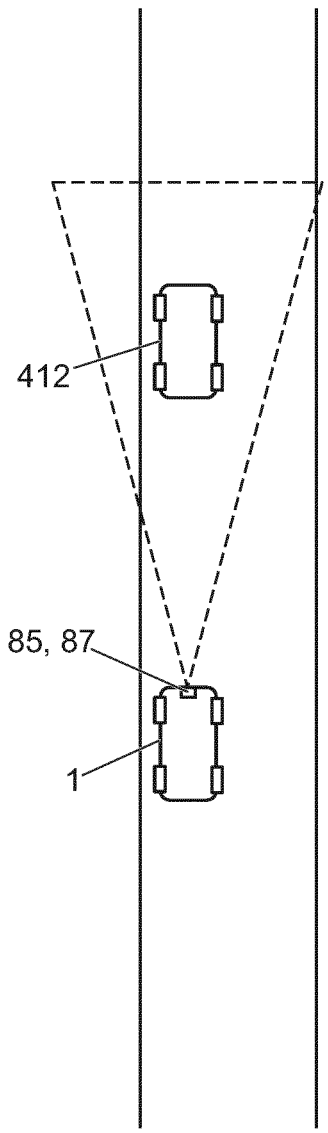
FIG. 5 is a schematic illustration of a scenario in which a vehicle may be used.
Figure 6:
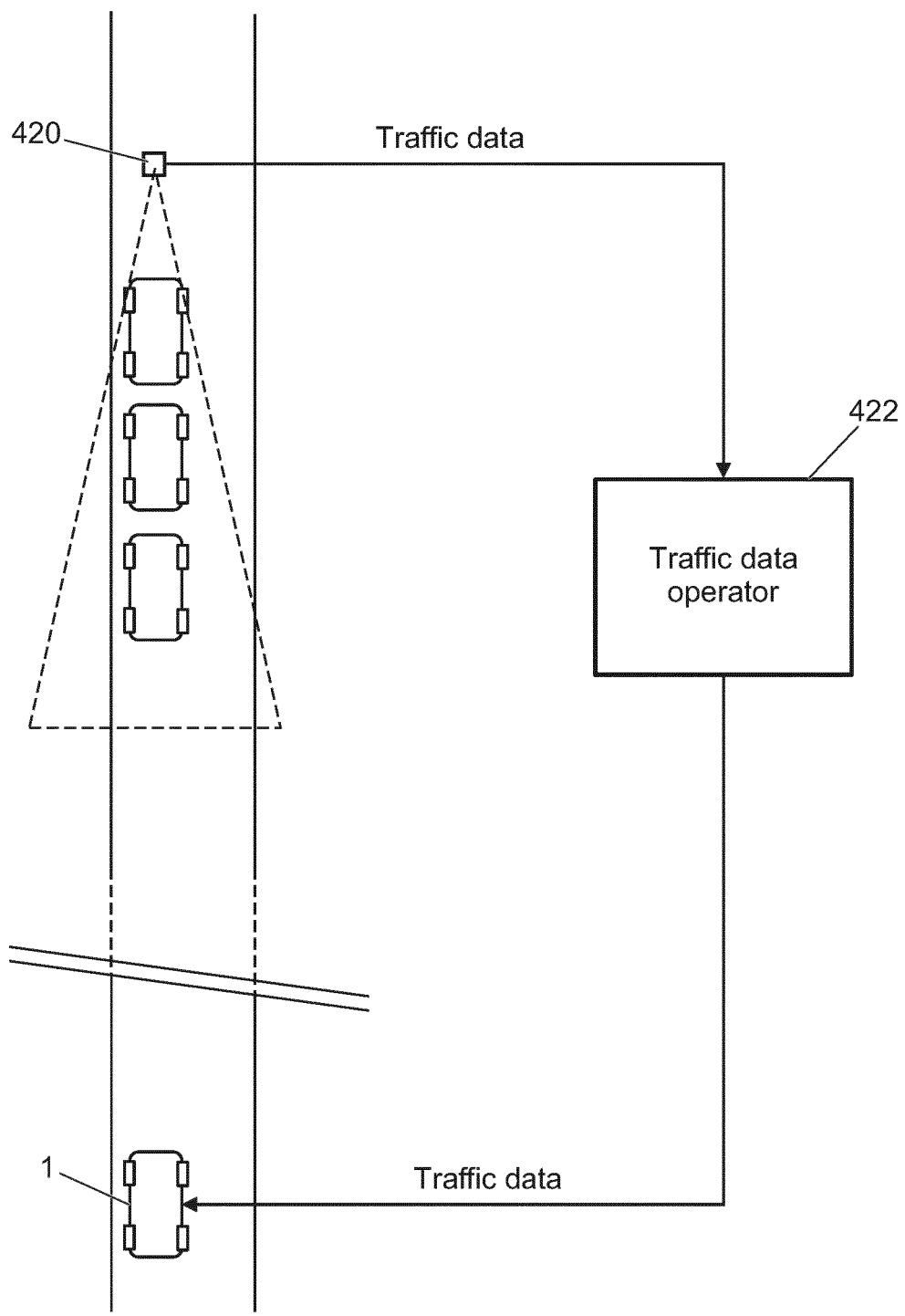
FIG. 6 is a schematic illustration of a scenario in which a vehicle may be used.

FIGS. 4 to 6 show examples of scenarios in which environment signals acquired by the vehicle may indicate a need to pre-emptively brake the vehicle.

FIG. 4 shows a vehicle 1 on a road. A camera module 85 on the vehicle 1 acquires an image, or sequence of images, of the road ahead of the vehicle 1. A traffic signal 410 is ahead of the vehicle 1. The traffic signal 410 is at red. Image processing of the acquired image(s) can detect that the traffic signal is at red. Information from the navigation system and/or map data may confirm the traffic signal 410 is on the route of the vehicle 1. In other words, this confirms that the traffic signal should be obeyed. The vehicle 1 uses the signal from the camera module 85 and, optionally, the map data and/or route data to determine whether there is a need to pre-emptively brake the vehicle by changing the driveline to the 4WD configuration.

FIG. 5 shows a camera module 85 or radar module 87 acquiring information about the road ahead of the vehicle 1. A target object (another vehicle 412) is detected ahead of the vehicle 1. Information from camera 85 and/or radar module 87 may provide information indicative of whether there is a need to brake the vehicle 1, e.g. because the target object is stopped or slowing down, or because vehicle 1 is approaching the target object too quickly. The vehicle 1 uses the signal from the camera 85 or radar module 87 to determine whether there is a need to pre-emptively brake the vehicle by changing the driveline to the 4WD configuration.

FIG. 6 shows use of traffic information from an external operator 422. Traffic data is acquired by the external operator 422. For example, the external operator 422 may own a network of sensors or cameras 420 which are deployed across a road network. The vehicle 1 receives the traffic data, such as by radio module 83. The vehicle 1 uses the traffic data to determine if there is a need to pre-emptively brake the vehicle 1. For example, the vehicle 1 may use information about the current position and/or route of the vehicle 1 to determine if the traffic data is relevant to the route of the vehicle 1.

If the controller 40 is causing the driveline 5 to operate in the two wheel drive mode, the VCU 1C is configured repeatedly to determine whether a transition to the four wheel drive mode should be made. The transition to the four wheel drive mode may be advantageous in enabling an increase in the amount of charge that may be generated by the CIMG 16 when driven as a generator by the driveline 5 to effect regenerative braking of the vehicle 1. This may also have the benefit of reducing wear of friction brakes of the vehicle associated with the braking system.

The VCU 1C can be configured to determine whether to pre-emptively brake the vehicle, by causing the driveline 5 to enter the four wheel drive mode, based on one or more of the following parameters:
(a) a signal indicative of the probability that the vehicle is required to slow to a halt or relatively low speed at a given moment in time;
(b) longitudinal acceleration of the vehicle;
(c) driving surface inclination;
(d) surface coefficient of friction between wheels of the vehicle and the driving surface;
(e) the driving mode in which the vehicle is operating;
(f) the powertrain mode in which the vehicle is operating;
(g) the state of charge (SOC) of the vehicle battery 1B; and
(h) vehicle speed.

A transition to the four wheel drive mode may be prohibited if the VCU 1C is causing the vehicle to operate in the hybrid inhibit powertrain mode, or if the SOC of the battery 1B exceeds a predetermined amount. In the present embodiment the predetermined SOC is 100% of the maximum allowable SOC in normal use of the vehicle 1. Other values may be useful in some embodiments, such as 95%, 90% or any other suitable value. It is to be understood that the maximum allowable SOC in normal use may be less than the actual maximum capacity of the battery 1B in order to increase a service life of the battery 1B. Similarly, the minimum allowable SOC in normal use may be greater than the actual absolute minimum SOC that the battery 1B may attain, in order to increase a service life of the battery 1B.

Similarly, in some driving modes a transition to the four wheel drive mode may be prohibited, for example in order to avoid, reduce or prevent noise, vibration or harshness (NVH) associated with the transition to the four wheel drive mode.

A transition to the four wheel drive mode may be prohibited by reference to the value of a parameter long_acc indicative of vehicle longitudinal acceleration, a parameter surface_incl indicative of driving surface inclination and a parameter surface_mu indicative of the coefficient of friction between wheels of the vehicle and the driving surface.

The value of parameter surface_mu is arranged to vary from a value of substantially zero, indicative of a relatively slippery surface corresponding to wet ice, to a value of unity indicative of a relatively high grip surface such as dry asphalt.

In some situations, the control system may be configured, when it is determined that there is a need to pre-emptively brake the vehicle, to cause the driveline to operate in a second configuration (4WD) and use a friction-based foundation braking system. For example, in situations where a large amount of braking is needed and conditions allow foundation braking.

In other situations, the control system may be configured, when the vehicle is in a second configuration (4WD) to moderate the amount of regenerative braking which occurs within the system or to modulate the ratio of regenerative braking to friction braking which occurs in order to optimise energy recovery during braking whilst maintaining control and the stability of the vehicle. The amount of regenerative braking may be dependent upon one or more of the following parameters:
(a) a signal indicative of the probability that the vehicle is required to slow to a halt or relatively low speed at a given moment in time;
(b) longitudinal acceleration of the vehicle;
(c) driving surface inclination;
(d) surface coefficient of friction between wheels of the vehicle and the driving surface;
(e) the driving mode in which the vehicle is operating;
(f) the powertrain mode in which the vehicle is operating;
(g) the state of charge (SOC) of the vehicle battery 1B; and
(h) vehicle speed.

It is to be understood that some embodiments of the present invention may be used with a range of different types of driveline, including drivelines in which a rear axle assembly of a vehicle is arranged to be permanently driven whilst the front axle assembly is arranged to be driven only when the four wheel drive mode is assumed, as well as drivelines in which a front axle assembly is arranged to be permanently driven whilst the rear axle assembly is arranged to be driven only when the four wheel drive mode is assumed, as in the case of the driveline 5 of the embodiment of FIG. 1.

Figure 7:
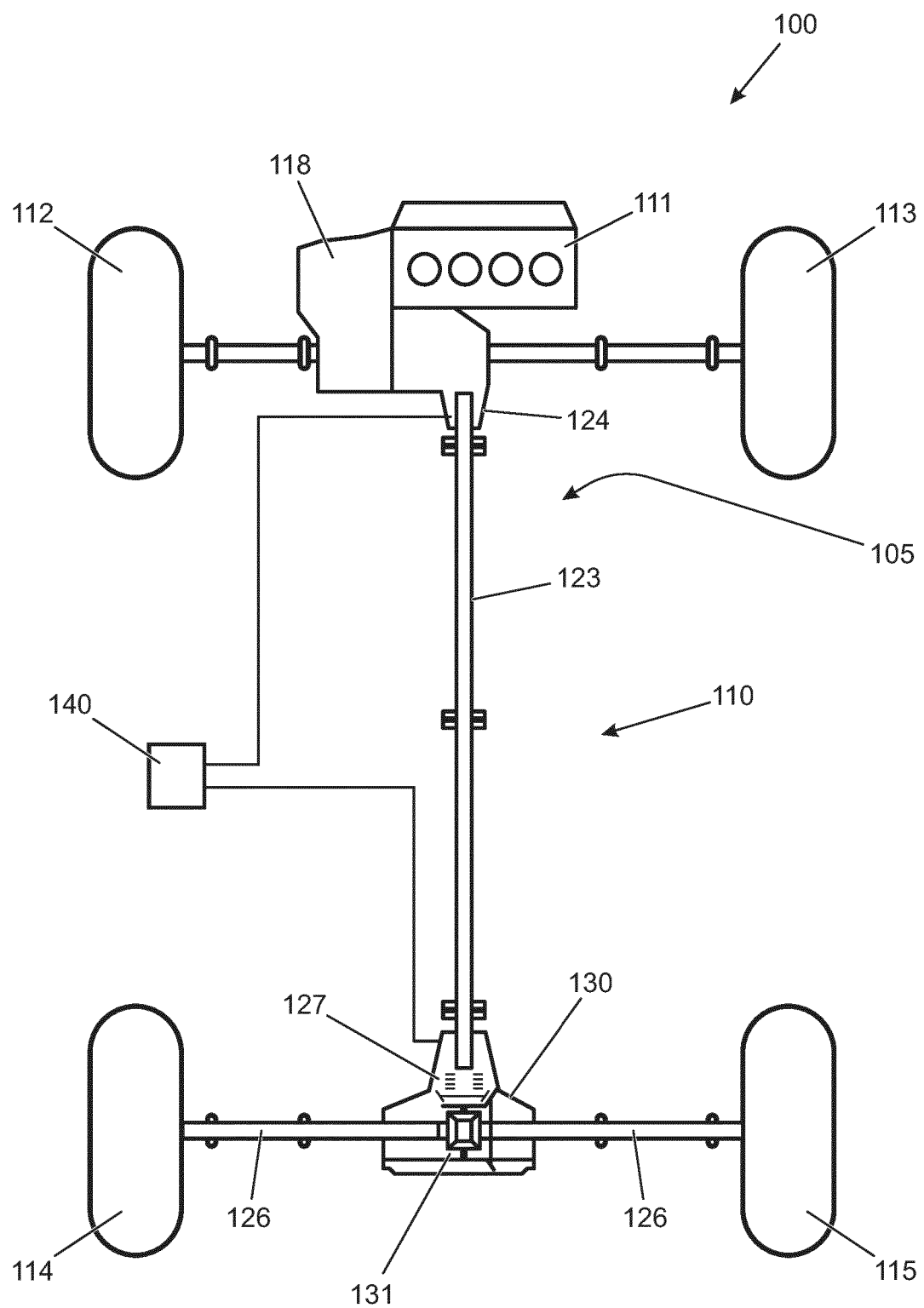
FIG. 7 is a schematic illustration of a vehicle according to a further embodiment of the present invention.

FIG. 7 illustrates a portion of a vehicle 100 according to a further embodiment of the present invention. Like features of the embodiment of FIG. 7 to those of the embodiment of FIG. 1 are shown with like reference signs incremented by 100.

The vehicle 100 has a driveline 105 having a PTU 124 having a PTC (not shown) configured to allow a prop shaft 123 to be connected to a gearbox 118. At an opposite end of the prop shaft 123, a rear drive unit 130 is provided having a clutch 127 in the form of a multi-plate wet clutch. The RDU 130 also has a differential gear arrangement 131 for driving respective left and right rear drive shafts 126. The clutch 127 is configured to connect the prop shaft 123 to an input portion of the differential gear arrangement 131. It is to be understood that the controller 140 is configured to cause the vehicle 100 to operate in the two wheel drive mode by controlling the PTU 124 to disconnect the prop shaft 123 from the gearbox 118, and controlling the clutch 127 of the RDU 130 to disconnect the prop shaft 123 from the differential 131. The controller 140 is also configured to cause the vehicle to operate in the four wheel drive mode by controlling the PTU 124 to connect the prop shaft 123 to the gearbox 118, and controlling the clutch 127 of the RDU 130 to connect the prop shaft 123 to the differential 131. In the embodiment of FIG. 7 the PTU 124 has a PTC in the form of a multi-plate wet clutch. In an alternative embodiment the PTC is in the form of a dog clutch, the PTU 124 also having a synchroniser for synchronising the speed of rotation of input and output portions of the PTC when it is required to close the dog clutch.

The driveline 105 of the embodiment of FIG. 7 is not configured to allow cross-axle lock to be applied between rear wheels 114, 115 of the driveline 5. However in some alternative embodiments means may be provided for locking the rear drive shafts 126 together such that relative rotation may be substantially prevented. For example in some embodiments the rear drive shafts 126 may be arranged to be locked together by means of a clutch arrangement.

Figure 8:
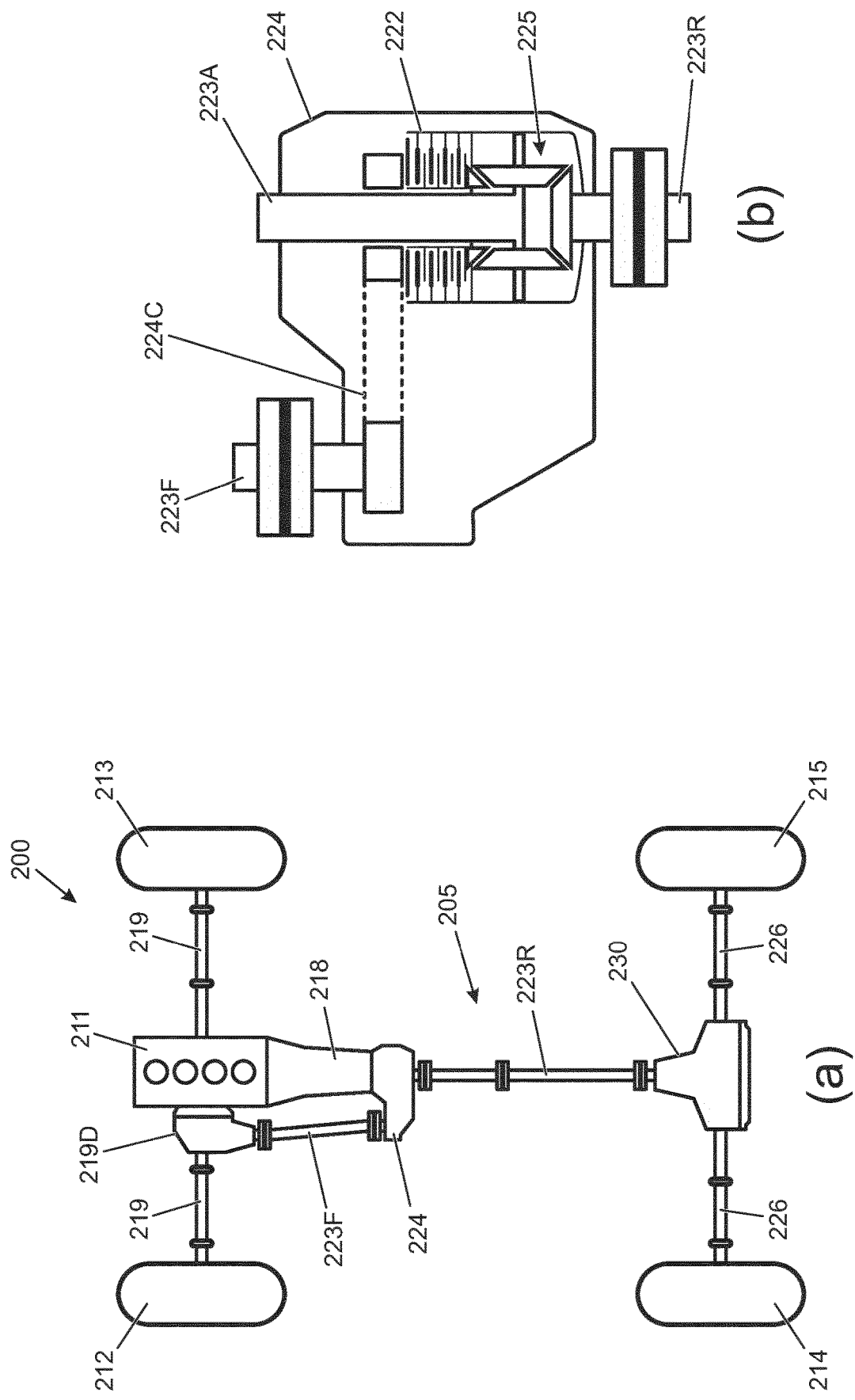
FIG. 8 is a schematic illustration of (a) a vehicle according to a still further embodiment of the present invention and (b) an enlarged view of a portion of the vehicle shown in (a)

FIG. 8(*a*) illustrates a portion of a vehicle 200 according to a further embodiment of the present invention. FIG. 8(*b*) is an enlarged view of a portion of the driveline 205 of the vehicle 200 shown in (a) and shows detail in respect of PTU 224. Like features of the embodiment of FIG. 8 to those of the embodiment of FIG. 1 are shown with like reference signs incremented by 200.

The driveline 205 has a PTU input shaft 223A (FIG. 8(*b*)) that is permanently connected to a gearbox 218, a front prop shaft 223F connectable to the PTU input shaft 223A via a power transfer clutch (PTC) 222 and a rear prop shaft 223R that is connected to the PTU input shaft 223A by means of a differential gear arrangement (or 'differential') 225. In the embodiment shown the differential 225 may be referred to as a 'centre differential' or 'centre diff' and forms part of the PTU 224. The differential 225 allows the front and rear prop shafts 223F, 223R to rotate at different respective speeds.

The rear prop shaft 223R is connected to an RDU 230 that is configured to allow the rear prop shaft 223R to be connected to and disconnected from rear wheels 214, 215. In the embodiment of FIG. 8 the RDU 230 is similar to RDU 130 of the embodiment of FIG. 7 although other types of RDU may be useful such as RDU 30 of the embodiment of FIG. 1.

The PTC 222 allows the front prop shaft 223F to be releasably connected to the PTU input shaft 223A via a chain drive 224C. The PTC 222 is a multi-plate wet clutch in the embodiment of FIG. 8 although other types of clutch may be useful in some embodiments, such as a dog clutch. The front prop shaft 223F is in turn arranged to drive a pair of front drive shafts 219 via a front differential unit 219D. The front differential unit 219D has a differential gear arrangement that allows the prop shafts 219 to rotate at different respective speeds.

Figure 9:
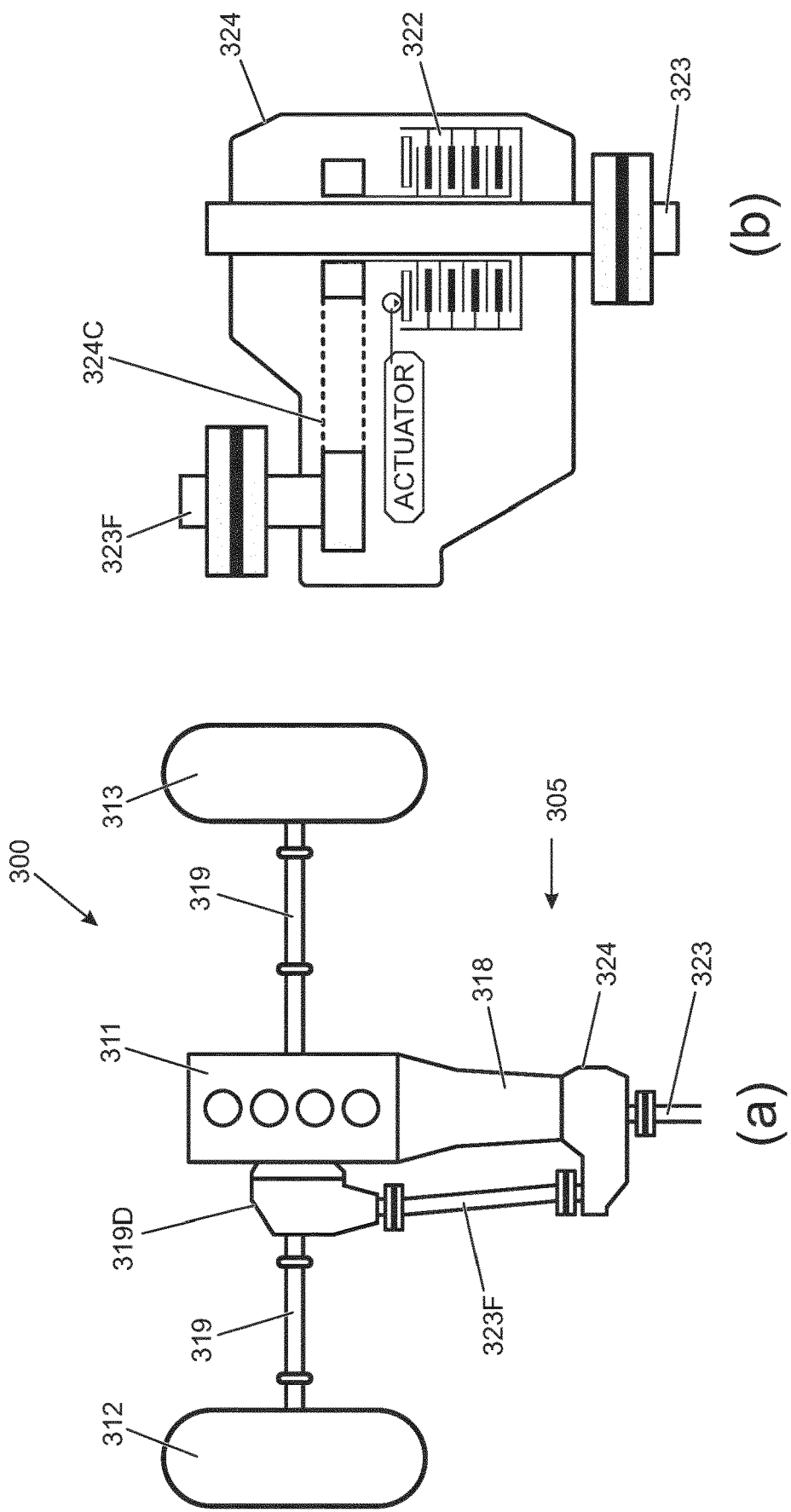
FIG. 9 is a schematic illustration of (a) a vehicle according to an embodiment of the present invention and (b) an enlarged view of a portion of the vehicle shown in (a).

In some embodiments the PTU 224 may be provided without the differential 225. FIG. 9 shows a portion of a driveline 305 having such a PTU. Like features of the embodiment of FIG. 9 to those of the embodiment of FIG. 1 are shown with like reference signs incremented by 300.

In the arrangement of FIG. 9, a single prop shaft 323 connects gearbox 318 via PTU 324 to an RDU (not shown). The PTU 324 has a PTC 322 in the form of a multi-plate wet clutch 322 (FIG. 9(*b*)) that is configured to allow the prop shaft 323 to be connected to a front prop shaft 323F that is arranged in turn to drive a front differential unit 319D. The PTC 322 is arranged to drive the front prop shaft 323F via a chain drive 324C. It is to be understood that, in some embodiments, the front differential unit 319D may be provided with a clutch, for example a multi-plate wet clutch, allowing the portion of the driveline between the PTC 322 and clutch of the front differential unit 319D to be disconnected from drive shafts 319.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A control system configured to control a driveline of a motor vehicle to operate in a selected one of a plurality of configurations, the control system comprising a controller configured to:
   receive an environment indication signal indicative of a presence of traffic lights ahead of the vehicle,
   predict, based on the environment indication signal, whether the vehicle will be required to slow to a halt or a relatively low speed at a moment in time,
   cause the driveline to operate in a second configuration and not a first configuration, before brake torque is demanded of a braking system of the vehicle when it is predicted that the vehicle will be required to slow to a halt or a relatively low speed at the moment in time,
   employ regenerative braking when brake torque is demanded, whereby wheels connected to the driveline cause one or more electric machines coupled to the driveline to generate electrical current for storage in a charge storage device,
   wherein in the first configuration a first group of one or more wheels are arranged to be driven by the driveline and in the second configuration the first group of one or more wheels and a second group of one or more wheels are arranged to be driven by the driveline.

2. The control system according to claim 1, wherein the environment indication signal is further indicative of a state of the traffic lights.

3. The control system according to claim 1, wherein the controller is configured to
   receive a traffic signal indicative of traffic ahead of the vehicle; and
   predict whether the vehicle will be required to slow to a halt or a relatively low speed based on the traffic signal and the environment indication signal.

4. The control system according to claim 1, wherein the controller is configured to
   receive a traffic signal indicative of at least one of density of traffic and speed of traffic; and
   predict whether the vehicle will be required to slow to a halt or a relatively low speed based on the traffic signal and the environment indication signal.

5. The control system according to claim 1, wherein the controller is configured to
   receive a speed limit signal indicative of a speed limit; and
   predict whether the vehicle will be required to slow to a halt or a relatively low speed based on the speed limit signal and the environment indication signal.

6. The control system according to claim 1, wherein the environment indication signal is received from a camera.

7. The control system according to claim 1, wherein the environment indication signal is received from a radar module which provides an indication of at least one object relative to the vehicle.

8. The control system according to claim 7, wherein the radar module indicates at least one of a position of objects relative to the vehicle and a speed of objects relative to the vehicle.

9. The control system according to claim 1, wherein the environment indication signal is received from a data link to the vehicle.

10. The control system according to claim 1, wherein the controller is configured to use a combination of map data and the environment indication signal to determine whether there is a need to brake the vehicle.

11. The control system according to claim 1, wherein the controller is configured to predict whether the vehicle will be required to slow to a halt or a relatively low speed based on at least one of:
- an amount of longitudinal acceleration experienced by the vehicle;
- an inclination of a driving surface;
- gradient;
- a parameter indicative of a coefficient of surface friction between one or more wheels and a driving surface; and
- a selected one of a plurality of driving modes in which the vehicle is operating.

12. The control system according to claim 1, wherein the controller is further configured to determine an amount of the regenerative braking.

13. The control system according to claim 12, wherein the controller is configured to determine the amount of the regenerative braking required dependent upon at least one of the following parameters:
 (a) a signal indicative of a probability that the vehicle is required to slow to a halt or a relatively low speed at the moment in time;
 (b) longitudinal acceleration of the vehicle;
 (c) driving surface inclination;
 (d) surface coefficient of friction between wheels of the vehicle and a driving surface;
 (e) a driving mode in which the vehicle is operating;
 (f) a powertrain mode in which the vehicle is operating;
 (g) a state of charge (SOC) of a vehicle battery; and
 (h) vehicle speed.

14. A powertrain comprising a driveline and the control system according to claim 1.

15. A motor vehicle comprising the control system according to claim 1.

16. A motor vehicle comprising the system according to claim 1, a body, a powertrain to drive said wheels, the powertrain comprising the driveline and a braking system to brake said wheels.

17. A method of controlling a driveline of a motor vehicle to operate in a selected one of a plurality of configurations, the method comprising:
- receiving an environment indication signal indicative of a presence of traffic lights ahead of the vehicle;
- predicting, based on the environment indication signal, whether the vehicle will be required to slow to a halt or a relatively low speed at a moment in time; and
- when it is predicted that the vehicle will be required to slow to a halt or a relatively low speed at the moment in time, causing the driveline to operate in a second configuration and not a first configuration,
- employing regenerative braking when brake torque is demanded, whereby wheels connected to the driveline cause one or more electric machines coupled to the driveline to generate electrical current for storage in a charge storage device,
- wherein in the first configuration a first group of one or more wheels are arranged to be driven by the driveline and in the second configuration the first group of one or more wheels and a second group of one or more wheels are arranged to be driven by the driveline.

18. A non-transitory storage medium containing a computer program executable on a processor so as to implement the method of claim 17.

19. A processor arranged to implement the method of claim 17.

* * * * *